W. WITTER.
PROCESS OF RECOVERING VOLATILE METALS AND METALLOIDS FROM LEAD AND COPPER SLAGS.
APPLICATION FILED JUNE 20, 1908.
927,916. Patented July 13, 1909.
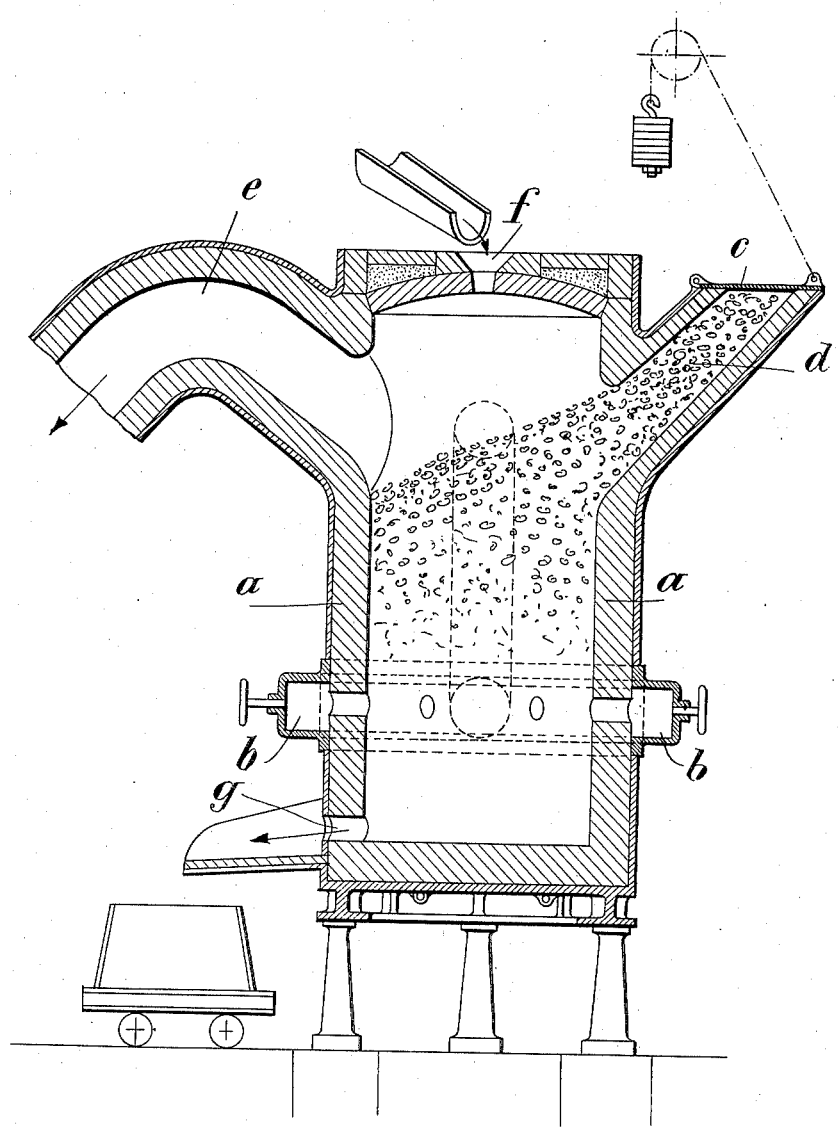
Witnesses:
C. H. Crawford
E. Schallinger
Inventor
Wilhelm Witter.
by B. Singer, Attorney.

UNITED STATES PATENT OFFICE.

WILHELM WITTER, OF HAMBURG, GERMANY.

PROCESS OF RECOVERING VOLATILE METALS AND METALLOIDS FROM LEAD AND COPPER SLAGS.

No. 927,916.  Specification of Letters Patent.  Patented July 13, 1909.

Application filed June 20, 1908. Serial No. 439,552.

*To all whom it may concern:*

Be it known that I, WILHELM WITTER, metallurgist, residing at Ifflandstrasse 73, Hamburg, Germany, have invented a certain new and useful Process of Recovering Volatile Metals and Metalloids from Lead and Copper Slags, of which the following is a specification.

In smelting lead and copper ores, and in other metallurgical operations, there are often obtained slags with a relatively high percentage of zinc, for instance, 5-15% and other volatile metals and metalloids. As up to now it was impossible to separate the zinc from such slags in a profitable manner, the zinc contents had to be considered as wasted.

The object of the present invention is to separate and recover, in a simple and cheap manner, the zinc and other volatile metals and metalloids from such slags and from similar products and ores.

According to this invention, the zinciferous slag is made use of in a molten liquid state, *i. e.* as it is poured off in lead or copper operations. In case a slag already solidified or other solid product or ore containing zinc has to be submitted to the present process, such slag or ore must first be converted, by smelting, into a liquid molten mass.

The separating of zinc and other volatile metals and metalloids from this molten liquid bath of slag or ore is, according to the present invention, effected as follows: The molten liquid mass is brought in close contact with carbonaceous fuel, an air current being applied at the same time. The compounds of volatile metals and metalloids contained in the molten mass will then be reduced by the action of the fuel; the air being present in excess will cause the metal and metalloid vapors thus formed to oxidize into oxides, these oxides being taken along with the escaping current of air and combustion gases to a condensing plant where they are deposited and caught. For carrying out the process the apparatus shown in the drawings may be used.

This apparatus consists of a kind of cupola or blast-furnace $a$, to which compressed air may be delivered by means of twyers $b$, or the air may be supplied to the furnace by suction draft. Coke in lumps or like combustible material is being fed to the interior of the furnace through the opening $d$ which may be closed by means of cover $c$. An exhausting pipe $e$ allows the gases and oxids carried along with them to escape to the condensing plant not shown in the drawing, which may consist, for instance, of a baghouse. The molten mass, the zinc and other volatile metals and metalloids of which are to be extracted, is poured in through the opening $f$ at the top of the furnace.

$g$ is a tap-hole for discharging the slag freed of the zinc.

Once the furnace is filled with coke and the whole charge of coke brought to incandescence by the air-current, the molten liquid slag is poured in through the opening $f$ and flows down upon the live coke. An air-current is applied through the twyer $b$ and is kept on so as to maintain an oxidizing atmosphere in the furnace. The air causes the coke to burn down thus maintaining the high temperature necessary for the reduction of the volatile metals and metalloids contained in the mass. In the proportion as the coke is consumed near the twyers, fresh coke has to be introduced through the opening $d$ of the furnace. The molten slag settling down through and with the incandescent coke is thus submitted to the reducing action of the live fuel as well as to the oxidizing action of the ascending current of air and combustion gases, this having for effect, as stated above, that the compounds of volatile metals and metalloids contained in the molten slag will be reduced and the metal and metalloid vapors thus formed, as fast as generated will be again converted into oxids. These oxids are taken along with the escaping current of gases and escape through the exhaust pipe $e$ to the condensing plant, where they are deposited and may be recovered in a solid form. The slag-mass freed of its zinc is flowing down past the twyer $b$ into the hearth of the furnace where it is gathering and can be removed from the furnace through the tap-hole $g$ either in a continuous or in an intermittent manner.

I claim—

1. A process of recovering in the form of oxids volatile metals and metalloids, especially zinc, from metallurgical products and ores, which consists in bringing the products or ores, when in a molten liquid state, into close contact with incandescent carbonaceous matter in the presence of an air-current consuming the carbonaceous matter for reducing the metals and metalloids to be recovered, and for maintaining the reduction and volatilization temperature, reoxidizing the reduced volatile metals and metalloids, and causing the so-formed oxids to escape with the current of combustion gases.

2. A process for recovering in the form of oxids volatile metals and metalloids, especially zinc, from metallurgical products and ores, which consists in pouring the products or ores, when in a molten liquid state, upon a layer of incandescent fuel, forcing an air-current from below through the fuel layer, consuming the fuel for reducing the metals and metalloids to be recovered, and for maintaining the reduction and volatilization temperature, reoxidizing the reduced volatile metals and metalloids, and causing the so-formed oxids to escape with the current of combustion gases.

In testimony that I claim the foregoing as my invention, I have signed my name in presence of two witnesses, this 10th day of June 1908.

WILHELM WITTER.

Witnesses:
ERNEST H. L. MUMMENHOFF,
OTTO W. HELLMRICH.